United States Patent [19]

Mise et al.

[11] Patent Number: 6,123,759
[45] Date of Patent: Sep. 26, 2000

[54] CARBON BLACK, PROCESS FOR PRODUCING THE SAME, AND AQUEOUS DISPERSION AND WATER-BASE INK BOTH CONTAINING THE SAME

[75] Inventors: Nobutake Mise, Kitakyushu; Masahiro Yamada; Takashi Hirasa, both of Yokohama, all of Japan

[73] Assignee: Mitsubishi Chemical Corporation, Tokyo, Japan

[21] Appl. No.: 09/117,291

[22] PCT Filed: Dec. 26, 1997

[86] PCT No.: PCT/JP97/04920

§ 371 Date: Nov. 5, 1998

§ 102(e) Date: Nov. 5, 1998

[87] PCT Pub. No.: WO98/30638

PCT Pub. Date: Jul. 16, 1998

[30] Foreign Application Priority Data

| | | | |
|---|---|---|---|
| Dec. 26, 1996 | [JP] | Japan | 8-347529 |
| Jan. 7, 1997 | [JP] | Japan | 9-000699 |
| Jan. 29, 1997 | [JP] | Japan | 9-015222 |
| Sep. 19, 1997 | [JP] | Japan | 9-256388 |

[51] Int. Cl.$^7$ .............. C09D 11/02; C09C 1/56

[52] U.S. Cl. .......... 106/31.9; 106/472; 106/478; 423/449.5

[58] Field of Search .............. 106/31.9, 472, 106/478; 423/449.5

[56] References Cited

U.S. PATENT DOCUMENTS

| | | | |
|---|---|---|---|
| 3,620,792 | 11/1971 | Hagopian | 106/478 |
| 3,959,008 | 5/1976 | Warner et al. | 106/472 |
| 3,992,218 | 11/1976 | Suetsugu et al. | 106/472 |
| 5,184,148 | 2/1993 | Suga et al. | 106/31.9 |
| 5,395,435 | 3/1995 | Mizobuchi | 106/31.26 |
| 5,609,671 | 3/1997 | Nagasawa | 106/31.9 |

FOREIGN PATENT DOCUMENTS

| | | |
|---|---|---|
| 50-142626 | 11/1975 | Japan . |
| 3-210373 | 9/1991 | Japan . |

*Primary Examiner*—Helene Klemanski
*Attorney, Agent, or Firm*—Oblon, Spivak, McClelland, Maier & Neustadt, P.C.

[57] ABSTRACT

A method for producing oxidation-treated carbon black, which comprises oxidizing carbon black by ozone in the presence of water until the total amount of acid groups of the carbon black becomes at least 3 $\mu$equ/m$^2$.

11 Claims, No Drawings

ND AQUEOUS
CARBON BLACK, PROCESS FOR PRODUCING THE SAME, AND AQUEOUS DISPERSION AND WATER-BASE INK BOTH CONTAINING THE SAME

TECHNICAL FIELD

The present invention relates to carbon black useful particularly as a pigment for ink jet ink and writing ink, and a method for its production, as well as a water-base ink containing such oxidation-treated carbon black.

BACKGROUND ART

Ink jet recording has characteristics such that the noise during recording is small, color printing is possible, high speed printing is possible, printing can be made on ordinary paper to have high quality, and it is accordingly widely used for printing by computers irrespective of personal use or office use. Various systems are available for this ink jet printing, including a method wherein an ink in a slender nozzle provided in a recording head, is discharged by static energy, a method wherein an electric current is conducted to a heating zone in a recording head so that bubbles will be formed by the heat generation thereby to discharge the ink from a nozzle to carry out printing.

As an ink to be used for such ink jet recording, it has been common to employ a water-base ink having a dye dissolved or dispersed in water. Such a water-base ink is used also for writing utensils such as fountain pens or ballpoint pens.

The following items may be mentioned as the properties required for a recording ink to be used for such applications.

(1) Printed or written letters will have no bleeding.
(2) Printed or written letters will not be discolored by light or heat.
(3) Even when left to stand for a long period of time, it causes no clogging of a pen point or a nozzle in a recording head.
(4) Its storage stability is good.
(5) The viscosity of the ink is low.

As mentioned above, as an ink for these applications, it has been common to employ an ink having a dye dissolved or dispersed as a coloring agent in water. However, when a dye is employed, there is a problem that bleeding is likely to be observed in the printed or written letters, or discoloration is likely to occur by light. Accordingly, an attention has recently been drawn to an ink which employs carbon black as a black pigment.

However, if such carbon black is used as a pigment for ink, the dispersibility of carbon black in water is poor, since the surface of carbon black is lipophilic, whereby carbon black is likely to cause clogging of a pen point or a nozzle, or aggregates are likely to form during storage, whereby it becomes no longer practically useful. Accordingly, it is required to add various dispersing agent.

Here, as the dispersing agent, a dispersant containing in its molecule both lipophilic groups having good affinity with carbon black and hydrophilic groups having good affinity with water, specifically mainly a resin dispersant, is employed to improve the dispersibility or the dispersion stability.

However, such a resin dispersant is expected to provide its effects as bonded to the surface of carbon black. Accordingly, the dispersing effect can not be obtained unless it is added in an amount in excess of the amount required for bonding to the surface of carbon black. Therefore, an excess dispersant will remain in the liquid, and when the ink at a pen point or in the nozzle, is dried, it turns to a solid which is hardly re-solubilized and which causes clogging. Further, as the dispersant is added, the viscosity of the ink increases, whereby there will be a problem that constant discharge of ink can not be attained.

To overcome these problems, JP-A-8-3498 discloses an attempt to improve the dispersion stability without using a dispersant, by reacting carbon black with a sodium hypochlorite solution to oxidize the carbon black more than the commercial products and to have the surface subjected to hydrophilic treatment. However, by such a method, many chlorine ions and sodium ions used as the oxidizing agent are present in the liquid. Accordingly, to use such a product as an ink, it is necessary that the reaction product is once filtered and then purified by a reverse osmosis membrane or ultra filtration. Further, the oxidation treatment is carried out at a high temperature of 100° C. for a long period of time of 12 hours, whereby humic acid soluble in water, will form.

Further, as a case where commercial carbon black is further subjected to oxidation treatment, JP-A-7-258578 discloses that using a gas phase low concentration ozone, commercial carbon black is subjected to oxidation treatment for a long period of time.

However, with carbon black subjected to oxidation treatment by such a method, the surface of carbon black is remarkably eroded, probably because the action of the oxidizing agent is strong, whereby the surface area increases, and at the same time, humic acid soluble in water will be formed. Further, it has been found by a study by the present inventors that functional groups of carbon black formed by such treatment have no adequate affinity with water, although the reasons are not known, whereby the dispersion stability is inadequate.

Thus, humic acid and sodium ions will be present in large amounts in a water-base ink containing carbon black subjected to oxidation treatment using, as an oxidizing agent, ozone in a gas phase or sodium hypochlorite as the above-described prior art, and, as disclosed for example in JP-B-7-51687, these impurities will become solid at a pen point or in a nozzle and thus cause clogging.

Further, as an oxidation treatment method, JP-A-50-142626 discloses a method wherein, while an aqueous medium and carbon black are stirred and mixed, ozone is supplied through pores from a lower portion of the stirring tank. However, here, a method of dispersing into a hydrophobic vehicle such as oil by flushing (oil is added to the aqueous mixture of a pigment powder with stirring to transfer the pigment powder to the oil phase), is disclosed, and nothing is disclosed with respect to carbon black excellent in the dispersibility in an aqueous medium, which is useful particularly as a pigment for a water-base ink, particularly for an ink for ink jet. It is disclosed undesirable that ozone is introduced in excess of $2 \times 10^{-5}$ gr mol per 1 $m^2$ of the specific surface area of furnace black. Thus, it appears intended that the degree of oxidation of the resulting carbon black should preferably be low. However, no specific degree of oxidation is disclosed. Thus, heretofore, a method has not been found which is capable of obtaining carbon black excellent in dispersibility in an aqueous medium which is useful as a pigment for a water-base ink, particularly for an ink for ink jet, and there has been a problem when carbon black is used as a pigment for a water-base ink.

It has been desired to solve the above-described problem of the prior art and to provide an ink and a pigment for a water-base ink excellent in dispersion stability and excellent in discharge stability, whereby clogging of a pen point or a nozzle can be prevented.

Further, spherical foreign matters, i.e. micro foreign matters of from 1 to 20 μm made of a solidified product of sprayed raw material oil, present in carbon black, are hardly removable from the carbon black. Therefore, at the time of producing a water-base ink or a solvent-containing ink, such carbon black is put into e.g. a beads mill as it is, followed by dispersion to obtain an ink. As a result, the micro foreign matters are disintegrated to fragments of from a few hundred nm to a few μm, whereby not only the size has been reduced, but the number of particles has increased substantially.

An ink containing such foreign matters had a problem such that the foreign matters tended to precipitate during storage of the ink or in the case of a coating material, they became a source for causing hard spots in the coating film, or in a case where coated by a spin coater, the coating film had streaks. Therefore, after the dispersion, it took time for centrifugal separation or filtration, and even then, it was not easy to completely remove them. Further, it was not practically possible to produce carbon black containing little micro foreign matters.

It has been desired to establish production of a pigment, whereby removal of foreign matters is easy, an ink containing little micro foreign matters can efficiently be prepared, and the dispersion stability is excellent and when made into an ink or a coating material, the degree of blackness is high, and the gloss is good, and which is useful for a coating material having good coating film properties.

DISCLOSURE OF THE INVENTION

The present inventors have conducted an extensive study in view of the above problems and have found that by reacting carbon black with ozone in the presence of water, as is different from when oxidation treatment is carried out by ozone in a gas phase or when treatment is carried out by a sodium hypochlorite solution, it is possible to present a carbon black aqueous dispersion wherein the content of humic acid is small, alkali ions such as sodium ions are little, and the dispersion stability is good, and they have arrived at the present invention. It has been surprisingly found that by such a simple operation, it is possible to obtain carbon black having extremely good water dispersibility.

Here, it has also been found that by carrying out the oxidation treatment by ozone in water containing an organic acid, it is possible to reduce the amount of ozone used and to make short time treatment possible.

Further, it has been found that by removing humic acid to a certain specific concentration from the carbon black dispersion, it is possible to obtain a carbon black aqueous dispersion which is excellent in dispersibility and which has good discharge stability. It has been found also that by using carbon black subjected to oxidation treatment by a certain specific method, it is readily possible to prepare a dispersion having a proper value of the humic acid concentration. Further, it has also been found that by adjusting the content of micro foreign matters to a level of not higher than a certain specific value, it is possible to obtain a black pigment having good properties.

Namely, the present invention resides in:

A method for producing oxidation-treated carbon black, which comprises oxidizing carbon black by ozone in the presence of water until the total amount of acid groups of the carbon black becomes at least 3 $\mu$equ/m$^2$;

A method for producing oxidation-treated carbon black, which comprises oxidizing carbon black by ozone in the presence of water which contains at least 0.001N of an organic acid;

Oxidation-treated carbon black prepared by oxidation treatment of a carbon black wherein spherical carbon micro foreign matters are at most 50 particles/visual field;

Oxidation-treated carbon black prepared by oxidation-treating carbon black with an oxidizing agent, wherein the total amount of acid groups is 3 $\mu$equ/m$^2$, and the extracted humic acid concentration is at most 1 as absorbance; and Furnace carbon black wherein the DBP oil absorption is at least 95 cc/100 g, and the total amount of acid groups is at least 500 $\mu$equ/g.

Firstly, carbon black to be subjected to oxidation treatment in the present invention is not particularly limited, and any material may be employed so long as it is carbon black which has been commonly used as a pigment for ink.

Further, alkali metals or alkaline earth metals in carbon black should better be little, since they dissolve in water and lower the efficiency of the ozone oxidation in liquid. They are preferably at most 1 wt %, more preferably at most 0.5 wt %, still further preferably at most 0.1 wt %, in their total amount.

Further, sulfur or sulfur compounds, or chlorine compounds, in carbon black should better be as small as possible, since they may be oxidized to form strong acids in the solution and have an action to hinder ionization of the functional groups formed on the surface of carbon black. They are preferably at most 0.5 wt %, more preferably at most 0.1 wt %, as analyzed as total sulfur or as analyzed as total chlorine. To lower the sulfur content, it may be possible to use a low sulfur content material as an aromatic hydrocarbon to be used as raw material for carbon black or as a liquid hydrocarbon or gaseous hydrocarbon to be used as fuel. Further, the chlorine content can be reduced by using pure water as water to be used as cooling water during the production of carbon black.

The amount of sulfur in carbon black can be determined, for example, by accurately weighing 0.1 g of carbon black, followed by measurement by "SULMHOGRAPH12A" manufactured by BESTOFF.

Oxidation Treatment

The method for the oxidation treatment of the above carbon black is not particularly limited. However, it is particularly preferred to carry out oxidation treatment by ozone. For the oxidation treatment by ozone, there may be mentioned a method for carrying out oxidation treatment by ozone in a gas phase (JP-A-7-258578) and a method for carrying out oxidation treatment in water. It is more preferred to carry out the oxidation treatment in the presence of water. It has been made clear by a study by the present inventors that it is thereby possible to remarkably improve the dispersibility when formed into a water-base ink. The amount of water for the ozone oxidation treatment in the presence of water is suitably such that the ratio (weight ratio) of carbon black to water is from 95:5 to 0.5:99.5, more preferably from 50:50 to 2:98, still more preferably from 20:80 to 5:95. Water and carbon black are thus mixed, and to this mixture, ozone is introduced to carry out oxidation treatment of carbon black. Specifically, oxidation treatment of carbon black can be carried out by supplying ozone and/or an ozone-containing gas.

It is unnecessary to preliminarily oxidize carbon black to be used for oxidation treatment. However, conventional carbon black treated by nitric acid or ozone in a gas phase prior to the ozone oxidation in the presence of water, may be subjected to oxidation treatment by the method of the present invention.

The present invention is characterized in that oxidation treatment of the above carbon black is carried out in the presence of water. The amount of water is suitably such that the ratio (weight ratio) of carbon black to water is from 95:5 to 0.5:99.5, more preferably from 50:50 to 2:98, still more preferably from 20:80 to 5:95. Water and carbon black are thus mixed, and to this mixture, ozone is introduced to carry out oxidation treatment of carbon black. Specifically, the oxidation treatment of carbon black can be carried out by supplying ozone and/or an ozone-containing gas.

By using ozone as an oxidizing agent, carbon black can be oxidized at room temperature, as is different from a case where the oxidation reaction proceeds at a high temperature with nitric acid, a nitrogen oxide, sulfuric acid or hypochlorites as other oxides which have been heretofore used for oxidation of carbon black.

Ozone is generated by an ozone generator, and it is introduced into a mixture of water and carbon black, whereby carbon black can be subjected to oxidation treatment in the presence of water. As the ozone generator, it is common to employ one wherein ozone is generated by discharge in air or oxygen, but it is also possible to generate ozone by electrolyzing water. As the generator to generate ozone, to be used in the present invention, any generator irrespective of the type may be employed. However, the higher the concentration of generated ozone, the better, as the reaction efficiency for oxidation of carbon black is better. In general, a generator which generates an ozone-containing gas having an ozone concentration of from 1 to 20 wt %, is commercially available, and such a generator is acceptable.

Thus, in the present invention, oxidation of carbon black is carried out by ozone in the presence of water, and oxidation is carried out until the total amount of acid groups on the surface of carbon black becomes to be a specific amount, as described hereinafter. The mechanism whereby oxidized carbon black having excellent properties can be obtained by such a simple operation as carrying out oxidation of carbon black by ozone in the presence of water, is not clearly understood. However, it is considered that if water is present on the surface of carbon black, ozone is not directly reacted with the surface of carbon black, and ozone once dissolves in water, so that oxidation is carried out in a state where the oxidizing force is weakened. Further, it is considered that since water is present, the temperature does not rise, and when it is reacted with carbon black, the reaction does not proceed deeply into the interior of carbon, whereby humic acid will not form. Further, it is considered that by the reaction in the presence of water, the resulting functional groups will have good affinity with water, whereby the dispersion stability will be obtained.

It is assumed that for these reasons, an unexpected effect can be obtained such that oxidation-treated carbon black will be one having dispersibility in water substantially improved even when compared with carbon black oxidized by ozone oxidation in a gas phase to an extent to have the same degree of the total content of acid groups.

In such an ozone oxidation reaction in the presence of water, the pH of the resulting dispersion tends to be low, and it is said that usually, aggregation of carbon black proceeds as the pH lowers. However, the oxidation-treated carbon black obtained by the present invention, has excellent properties as a pigment for a water-base ink such that the dispersion stability is good even at a pH of 2. Further, even when an alkali such as NaOH is added to an aqueous dispersion containing the oxidation-treated carbon black obtained by the present invention, the dispersion stability is excellent until the pH reaches 12.

In the present invention, oxidation treatment is carried out until the total amount of acid groups of the carbon black becomes at least 3 $\mu$equ/m$^2$ by the above-described oxidation treatment by ozone in the presence of water.

The total amount of acid groups can be obtained as the amount reacted with strong alkali such as NaOH or KOH.

Such a method for obtaining the total amount of acid groups is as follows. The oxidation-treated carbon black is subjected to filtration by means of a 0.1 $\mu$m membrane filter for separation from water. This separated carbon black is dried one day and night in a dryer at 60° C. and then pulverized by an agate mortar. This carbon black after drying is taken in an amount of from 0.2 to 0.5 g and put into an Erlenmeyer flask containing 60 cc of 0.01N NaOH. Nitrogen is circulated to this Erlenmeyer flask, and a reaction is carried out for 6 hours with stirring by a stirrer. This reaction product is subjected to filtration again by means of a 0.1 $\mu$m membrane filter to obtain a filtrate.

40 cc of this filtrate is taken, and titration is carried out by an automatic neutralization titration apparatus by means of 0.025N hydrochloric acid, to obtain the NaOH concentration in the filtrate.

The total amount of acid groups of carbon black can be obtained by the following calculation.

Total amount of acid groups=

$$\frac{0.01(N) \times 60(\text{cc}) - 0.025(N) \times \text{titer(cc)} \times 1.5}{1000 \times \text{weight of carbon black (g)}}$$

If the total amount of acid groups is less than 3 $\mu$equ/m$^2$, dispersion in aqueous medium tends to be difficult. More preferred is at least 6 $\mu$equ/m$^2$, whereby dispersibility in an aqueous medium will be excellent.

The upper limit of the total amount of acid groups is not particularly limited, but it is preferably at most 2.5 mequ/m$^2$, particularly preferably at most 2.0 mequ/m$^2$. Even if it exceeds 2.5 mequ/m$^2$, the effect for improvement of the dispersibility no longer increases, while carbon black tends to be decomposed to form an organic substance such as humic acid, whereby the yield tends to decrease.

Active Hydrogen Content

In the present invention, the active hydrogen content is preferably from 0.05 to 1.0 mequ/g, more preferably from 0.6 to 1.0. If it is less than 0.6 mequ/g, the content of an organic substance such as humic acid which tends to cause clogging or the like, tends to increase. If it exceeds 1.0 mequ/g, the dispersibility tends to be low.

The active hydrogen content is represented by the value measured by the following method.

To methylate active hydrogen of carbon black, 3 ml of a diethyl ether solution of diazomethane is dropwise added to 0.5 g of sample carbon black. It is heated and boiled in an aqueous hydrogen iodide solution to generate methyl iodide, which is transported by nitrogen gas and collected and precipitated in an aqueous silver nitrate solution. The collected solution is acidified with nitric acid, boiled and then filtered by a membrane filter (pore diameter: 0.2 $\mu$m) to collect the precipitate. The precipitate is dried at 50° C. and then the weight is measured to determine the amount of the active hydrogen.

Organic Acid

The oxidation treatment in the present invention is carried out preferably in such a state that an organic acid is contained in the water at a concentration of at least 0.001N. It has been made clear by a study by the present inventors that it is thereby possible to reduce the amount of ozone used and to shorten the time for the oxidation treatment. The content of the organic acid may be at least 0.001N, but it is particularly preferably at least 0.1N, whereby the effects for the reduction of the amount of ozone used and for the shortening of the time for the oxidation treatment, become more remarkable.

The mechanism whereby oxidized carbon black having excellent properties can be obtained by such a simple operation as carrying out oxidation of carbon black by ozone in water in the presence of an organic acid, is not clearly understood. However, it is considered that if water is present on the surface of carbon black, ozone does not react directly to the surface of carbon black, and ozone once dissolves in water, so that oxidation is carried out in a state where the oxidizing force is weakened. Further, it is considered that as water is present, the temperature does not rise, and when it is reacted with carbon black, the reaction does not proceed deeply into the interior of carbon, whereby humic acid will not form. Further, it is considered that as the reaction is carried out in the presence of water, the resulting functional groups also have a good affinity with water, whereby the dispersion stability is obtained.

As mentioned above, the reason as to why carbon black excellent in dispersibility in water can be obtained by ozone treatment using water as a medium, is not clearly understood, and the reason as to why the efficiency in oxidation treatment is good when an organic acid is contained in water by the present invention, is also not clearly understood. However, it is assumed that by the presence of an organic acid in water during the ozone oxidation treatment, the ozone and the organic acid react to form an organic peroxide, and probably because this organic peroxide is highly reactive, functional groups on the surface of carbon black will be sufficiently obtained even in a short period of time and even if the amount of ozone used is small.

The organic acid to be used here is preferably at least one member selected from an aliphatic acid, a dicarboxylic acid and an oxy acid. More specifically, the aliphatic acid may, for example, be formic acid, acetic acid, propionic acid or butyric acid; the dicarboxylic acid may, for example, be oxalic acid, malonic acid, succinic acid, glutaric acid, adipic acid, maleic acid or itaconic acid; and the oxy acid may, for example, be glucolic acid, malic acid, lactic acid or citric acid.

Humic Acid

By the ozone oxidation in water of the present invention, the humic acid content in the oxidation-treated carbon black can be suppressed as compared with oxidation treatment by conventional techniques.

It is well known that when carbon black is oxidized, humic acid will form on its surface. On the other hand, when subjected to oxidation treatment, carbon black becomes to have good affinity with water, and accordingly, an attempt has been made to use it as a pigment for a water-base ink by oxidation treatment alone or in combination with a dispersing agent. When it is used in such a manner, humic acid on the surface dissolves in water. Further, the higher the pH, the larger the amount of humic acid dissolved.

Humic acid is a substance having a functional group such as a carboxyl group or a hydroxyl group bonded to a polycyclic aromatic condensate, which forms when carbon such as coal is treated by an oxidizing agent, and it is a brown color. This substance is not a single substance, and it has a molecular weight distribution. However, humic acid at the time when carbon black is subjected to oxidation treatment, has absorption at a certain specific wavelength of ultraviolet, whereby the concentration can be obtained as absorbance at that wavelength.

For this analysis of the concentration of humic acid, the carbon black aqueous dispersion is subjected to filtration by means of a 0.1 μm membrane filter to obtain carbon black. This carbon black is dried for one day and night at 60° C. And, 10 g of this is put into an Erlenmeyer flask, and then 100 cc of water is put, whereupon a dispersion extraction operation is carried out for 10 minutes by means of an ultrasonic dispersion machine. After the extraction, pressure filtration is carried out by means of a 0.1 μm membrane filter.

At the initial stage of the filtration, a part of the carbon black leaks out, and the liquid of the initial stage is discarded and the liquid having carbon black completely removed, is collected.

This liquid is put into a quartz absorbance measuring cell of 10 mm×10 mm, and the maximum absorbance of ultraviolet of from 250 to 260 nm is measured by a photometer, and this value is taken as the extracted humic acid concentration. In a case where the absorbance of the liquid is too high to measure the absorbance by a photometer, the absorbance is determined by multiplying the value measured with respect to the liquid which is once diluted, by the diluting number of times.

The analysis of the concentration of humic acid in carbon black can be carried out by the following method. A dispersion having carbon black dispersed in water is subjected to pressure filtration by means of a 0.1 μm membrane filter.

At the initial stage of the filtration, a part of carbon black leaks out, and the liquid at the initial stage is discarded, and the liquid having carbon black completely removed, is collected.

This liquid is put into a quartz absorbance measuring cell of 10 mm×10 mm, and the absorbance of ultraviolet of 255 nm is measured by a photometer, and this value is taken as the extracted humic acid concentration of the carbon black.

The oxidation-treated carbon black of the present invention is one wherein the extracted humic acid concentration is at most 1 as absorbance. The oxidation-treated carbon black of the present invention wherein the extracted humic acid concentration is low as described above, provides an excellent effect such that when formed into a water-base ink composition, clogging of a nozzle can be prevented The extracted humic acid concentration is preferably 0.5 as absorbance, whereby such an excellent effect will be more remarkable.

It is surprising that when the oxidation treatment by ozone is carried out in the presence of water, even if oxidation is carried out to such an extent that the dispersion in an aqueous medium is good, the humic acid concentration will be low. Namely, it is possible to readily obtain one wherein the extracted humic acid concentration is at most 1, or even at most 0.5. Therefore, dispersions obtainable by dispersing the obtained oxidation-treated carbon black in various dispersing media, can be made to have very low humic acid concentrations, as they are, and they are very suitable for the preparation of a water-base ink excellent in the discharge stability. On the other hand, in the ozone oxidation in a gas phase or in the oxidation treatment by other oxidizing agents, formation of humic acid is not negligible, and it will be necessary to apply various means for removing humic acid to a dispersion of the oxidation-treated carbon black to reduce the concentration of humic acid. As a means for removing humic acid, a method of treating the dispersion with active carbon or a method of treating it with an ion exchange resin, may, for example, be mentioned.

Otherwise, the oxidation-treated carbon black is once dispersed in an aqueous medium to let humic acid dissolve, and then carbon black is taken out and dispersed in various vehicles for ink to obtain a dispersion, whereby an ink can be prepared. By the foregoing method, the humic acid concentration in the carbon black dispersion is preferably adjusted to be at most 1 as absorbance, particularly preferably at most 0.5 as absorbance. The analysis of the humic acid concentration in the dispersion can be carried out by the following method. The dispersion is subjected to pressure filtration by means of a 0.1 μm membrane filter. At the initial stage of the filtration, a part of carbon black leaks out, and the liquid at the initial stage is discarded, and the liquid having carbon black completely removed, is collected. This liquid is put into a quartz absorbance measuring cell of 10 mm×10 mm, and the absorbance of ultraviolet of 255 nm is measured by a photometer, and this value is taken as the humic acid concentration in the dispersion.

In the present invention, formation of humic acid by the oxidation treatment can be suppressed as described above. Therefore, it is readily possible to obtain, for example, an oxidation-treated carbon black wherein the extracted humic acid concentration is at most 1 as absorbance of the extract, and it is possible to prevent clogging due to formation of a solid at a pen point or in a nozzle and to provide particularly excellent properties as a black pigment for an application to ink, particularly an ink for ink jet. Here, the extracted humic acid is meant for humic acid which is extracted by the above-described dispersion extraction operation and measured as absorbance.

The oxidation-treated carbon black of the present invention prepared by carrying out oxidation treatment until the total amount of acid groups of carbon black becomes at least 3 μequ/m$^2$ by thus carrying out ozone oxidation in the presence of water by the present invention, can readily be dispersed in water simply by diluting it with water. Preferably, carbon black is diluted with water to a concentration of at most 20 wt %, whereby an extremely remarkable effect can be obtained such that the dispersion stability in an aqueous medium can be maintained as it is, without an addition of a dispersant or without dispersing treatment by e.g. a beads mill.

DBP Oil Absorption

The DBP oil absorption of carbon black is not particularly limited. However, particularly with carbon black having a DBP oil absorption and acid functional groups being within certain specific ranges, it is possible to present a water-base ink which provides a high printing density when formed into an aqueous dispersion, which prevents clogging at a pen point or in a nozzle and which is excellent in dispersibility and discharge stability, and besides, it is possible to obtain high performance carbon black which provides, in ink jet recording, a high printing density not only when print recording is made on a special paper but also when recording is made on an ordinary paper, and a water-base ink employing it.

Namely, it is furnace carbon black whereby the DBP oil absorption is at least 95 cc/100 g and the total amount of acid groups is at least 500 μequ/g.

As a method capable of producing carbon black having a high DBP oil absorption, in addition to the furnace method, a channel method, a roller method and an acetylene method may be mentioned. However, by the channel method or the roller method, the yield of the product to the starting material is low, and accordingly, impurities in the raw material tend to be concentrated, particularly, sulfur changes into sulfuric acid by oxidation, whereby only a product having poor dispensability can be obtained. Further, carbon black by the acetylene method, has high crystallinity of carbon black, whereby active sites reactive with an oxidizing agent, are little, whereby oxidation does not proceed adequately, such being undesirable. Therefore, carbon black produced by the furnace method, whereby the DBP oil absorption is at least 95 cc/100 g, and the total amount of acid groups is at least 500 μequ/g, is particularly preferred for the above purpose.

The higher the DBP oil absorption, the higher the printing density when used as an ink in the form of an aqueous dispersion. On the other hand, if the DBP oil absorption becomes high, the viscosity of the resulting water-base ink tends to be high. Therefore, the DBP oil absorption is at least 95 cc/100 g, preferably at least 100 cc/100 g, more preferably from 120 to 200 cc/100 g, particularly preferably from 120 to 180 cc/100 g, most preferably from 140 to 180 cc/100 g. Further, as oil absorption, measurement of 24M4 oil absorption having a weakly bonded structure removed, is also commonly used as a characteristic of carbon black. However, in a range where the DBP oil absorption is at least 120 cc/100 g, this presents a value lower by from about 5 to 50 cc/100 g than the DBP oil absorption. As such 24M4 oil absorption, it is usually at least 90 cc/g, more preferably at least 110 cc/g.

Measurements of these DBP oil absorption and 24M4 DBP oil absorption are in accordance with JIS K-6221.

In addition to the definition of the above DBP oil absorption, the total amount of acid groups of carbon black is defined to be at least 500 μequ/g, whereby the dispersion stability and the discharge stability, when made into an ink, will be excellent. It is particularly preferred that carbon black has a total number of acid groups per unit specific surface area of at least 3 μequ/m$^2$, especially at least 6 μequ/m$^2$, from the viewpoint of dispersibility. The upper limit is usually at most 500 μequ/m$^2$.

Such carbon black having a total amount of acid groups of at least 500 μequ/g can be obtained by oxidizing ordinary carbon black. In such a case, the specific surface area of carbon black used as the raw material is usually from 20 to 500 m$^2$/g, preferably from 100 to 450 m$^2$/g. The specific surface area can be measured by ASTM-D3037D method. By the above-mentioned oxidation treatment, the specific surface area may change by from a few % to 20%. Accordingly, in such a case, the DBP oil absorption after treatment may vary, and the DBP oil absorption after treatment may be adjusted to be at least 95 cc/100 g.

Particle Size

With respect to the particle size of carbon black, by the furnace method, the production can be made usually within a range of from 10 to 100 nm. However, within a range where the DBP oil absorption is at least 100 cc/100 g, the particle size does not substantially affect the printing density, and a high printing density can be obtained.

The particle size is preferably at most 100 nm, particularly at most 30 nm, whereby sedimentation of particles can be suppressed. The particle size suitable from the viewpoint of the storage stability, the discharge stability and the printing density, is at most 30 nm, and a more preferred particle size is at most 20 nm. Particularly preferred is at most 18 nm, and most preferred is at most 15 nm. The primary particle size is measured by an arithmetic mean diameter calculation method by an electron microscope.

As the particle size distribution, the carbon black of the present invention preferably has a cumulative mean diameter (volume cumulative 50% diameter) of from 10 to 500 nm, more preferably from 40 to 300 nm, and the specific surface area may sometimes vary to some extent from the raw material carbon black, but it is usually from 20 to 500 m$^2$/g, preferably from 100 to 450 m$^2$/g.

Carbon Black Wherein Spherical Carbon Micro Foreign Matters are Little

In the oxidation-treated carbon black, spherical carbon micro foreign matters are preferably 50 particles/visual field.

Here, the spherical carbon micro foreign matters are meant for spherical carbonaceous foreign matters having a particle size of from 1 to 20 $\mu$m included in the carbon black. Measurement of the number of such spherical carbon micro foreign matters, is carried out as follows.

Firstly, a sample is prepared by the following method. The carbon black is uniformly sprinkled on a cover glass for an optical microscope. From 1 to 2 cm above this cover glass, a high voltage generator (tesra) for checking vacuum leakage, was disposed, and discharge was carried out for from 1 to 2 seconds, so that by the impact, the carbon black is dispersed. This cover glass is pinched by a pincette, and gently tapped by a finger to remove carbon black which is not attached to the cover glass. This cover glass is introduced from one end into a 100 cc beaker containing deionized water to let a thin film of carbon float on the water. This film is scooped up with a sheet mesh for a transmission electron microscope (one having a size of 150 $\mu$m×150 $\mu$m is used; for example "Nisshin EM collodion membrane-attached sheet" is suitably employed).

Then, a sample thus prepared is observed by a transmission electron microscope, and spherical carbonaceous foreign matters of from 1 to 20 $\mu$m observed in one opening (one visual field) of the sheet mesh, are counted.

As the number of micro foreign matters, the total number of foreign matters present in ten openings is taken and represented by the number of particles/visual field.

In the present invention, it has been found that by subjecting carbon black wherein the content of spherical carbon micro foreign matters thus measurable is at most a certain specific level, to oxidation treatment, it is possible to substantially prevent formation of hard spots in a coating film when formed into a coating material or an ink, formation of streaks when coated by a spin coater, formation of sediment in an ink, or clogging of an ink nozzle.

The effects of the present invention can be obtained when the amount of spherical carbon micro foreign matters is at most 50 particles/visual field. However, more preferred is 30 particles/visual field, whereby the above effects will be particularly remarkable.

The method for obtaining such carbon black of the present invention wherein spherical carbon micro foreign matters are little, is not particularly limited. However, it is assumed that one of the factors for formation of spherical carbon micro foreign matters is solidification of sprayed raw material oil, and it has been found by the present inventors that it is possible to effectively suppress formation of spherical carbon micro foreign matters by e.g. controlling the furnace temperature during formation of carbon black at a high temperature or by controlling the size of the sprayed droplets of raw material oil to be small by e.g. dividing in a high speed gas stream or increasing the burner spray pressure, and it is particularly preferred to adopt these methods. Otherwise, spherical carbon micro foreign matters may be removed from a carbon black containing a large amount of spherical carbon micro foreign matters, by e.g. centrifugal sedimentation. However, spherical carbon micro foreign matters are not soluble in water, and they are foreign matters which can not easily be removed unless the carbon black is dispersed in e.g. water, whereby the operation tends to be cumbersome.

Further, when carbon foreign matters having a particle size of at least 1 $\mu$m are present in the carbon black, such particles may be removed by a filtration operation.

Dispersion in an Aqueous Medium

The oxidation-treated carbon black of the present invention as described in the foregoing, is useful as mixed with various media. Particularly when it is dispersed in an aqueous medium to obtain an aqueous dispersion, it is possible to obtain a water-base ink having excellent performance. Here, the aqueous medium means water or a mixture of water with a polar solvent miscible therewith. As specific examples of the polar solvent, a lower alcohol such as ethanol or isopropanol, a glycol solvent such as glycerol, diethylene glycol or polyethylene glycol, a nitrogen-containing solvent such as N-methylpyrrolidone or 2-pyrrolidone, and others such as urea, are typical.

The concentration of the oxidation-treated carbon black in the aqueous dispersion may suitably be selected depending upon the particular application. However, it is preferably a carbon black aqueous dispersion containing preferably from 0.5 to 50 wt %, particularly preferably from 0.5 to 20 wt %, of the carbon black. Within this range, the printing density will be good when made into an ink, and yet the viscosity of the ink can be controlled, to obtain an ink having excellent characteristics.

The pH of the aqueous dispersion is not particularly limited, but the pH is preferably from 2 to 10. The oxidation-treated carbon black of the present invention is excellent in dispersibility in water in such a wide range of pH.

The carbon black aqueous dispersion thus obtained can be used as a water-base ink by adding various additives, for example, by adding a dispersant as the case requires, when the concentration of carbon black exceeds 20 wt %. Further, as the case requires, it may be concentrated, dried and then separately diluted to use as an ink. In such a case, the oxidation-treated carbon black is added to water and may be subjected to dispersion treatment by e.g. a beads mill, a ball mill or an impact dispersing machine.

The additives used for the preparation of an ink, include, for example, a penetrating agent, a fixing agent and a mildew proof agent.

As the penetrating agent, a nonionic surfactant such as a polyoxyethylenealkyl aryl ether, an anionic surfactant such as an alkylbenzene sulfonate, a fluorine type surfactant, or diethylene glycol monobutyl ether, may, for example, be used.

As the fixing agent, a water-soluble resin (a nonionic water-soluble resin such as polyvinyl alcohol or polyacrylamide, or an anionic water-soluble resin such as polyacrylic acid or a styrene/acrylic water-soluble resin), or an aqueous emulsion, may, for example, be used.

When used as an ink for ink jet, one having a carbon black concentration of from 1 to 20 wt %, preferably from 5 to 10 wt %, is usually employed. To use as an ink for ink jet, it is advisable to adjust the pH to a level of from 7 to 10.

The ink of the present invention thus obtained will be well balanced in each of the discharge stability for a long time, the discharge stability after an interval of a long time, the storage stability, the fixing property to a recording material, the weather resistance of the recorded image and the printed density as well as the stability in forming droplets and the discharge stability, which are required as an ink for ink jet.

The above-described water-base ink can be suitably used for an ink cartridge which accommodates an ink absorbent having the water-base ink impregnated and which is provided with a head having a plurality of orifices for jetting such an ink in the form of ink droplets.

Further, it is possible to obtain an ink jet recording apparatus provided with an ink cartridge which accommodates the above ink absorbent having the water-base ink impregnated and which is provided with a head having a plurality of orifices for jetting such an ink in the form of in droplets, and the water-base ink can suitably be used.

Other Applications

Further, the carbon black of the present invention can be incorporated as a pigment to a coating varnish to obtain a coating composition. Here, the coating material usually comprises a pigment to cover the substrate, fat and oil, or a resin, which bonds to the substrate, forms a coating film and binds the pigment, and a solvent or a diluting agent for dissolving the fat and oil, or the resin, and it is a liquid to be coated for the purpose of protecting the substrate or improving the appearance of the substrate. It can be prepared by components and methods which are commonly known heretofore, except that as the pigment, the above-mentioned specific oxidation-treated carbon black is employed. Specifically, the oxidation-treated carbon black is incorporated to a various water-soluble coating varnish or solvent type coating varnish, followed by mixing and dispersing to obtain a coating composition.

The solvent type coating varnish is prepared by dissolving a vehicle in a solvent. As the vehicle for the solvent type coating material, oil and fat, or a synthetic resin may be employed. As the oil and fat, linseed oil or caster oil may be mentioned. As the resin, a phenol resin, a urea resin, a phthalic acid resin, a vinyl resin, a styrol resin, an acrylic resin or an epoxy resin may, for example, be mentioned. As the solvent, an alcohol such as methanol, a ketone such as acetone, an ester such as methyl acetate or an aromatic solvent such as toluene or xylene, may, for example, be mentioned.

As the vehicle for the water-soluble coating material, one having COOH groups or OH groups having an affinity with water introduced into the molecule, such as an acrylic resin, one neutralized with an amine, or one having a resin made into an emulsion by means of e.g. a dispersant, is employed, and it is common to disperse such a vehicle in water to obtain a water-soluble coating varnish.

EXAMPLES

Now, the present invention will be described in further detail with reference to Examples.

Example 1

20 g of commercially available carbon black ("#47" manufactured by Mitsubishi Chemical Corporation, sulfur content: 0.5%, total content of alkali metals and alkaline earth metals: 0.1%) was put into 500 cc of water and dispersed for 5 minutes by a household mixer.

The obtained liquid was put into a 3 lit. glass container equipped with a stirrer. While stirring by the stirrer, an ozone-containing gas having an ozone concentration of 8 wt % was introduced for 2 hours at 500 cc/min.

At that time, ozone was generated by using, as the ozone generator, an electrolytic generation type ozonizer made of PERMELEC ELECTRODE LTD.

The liquid after the ozone treatment was taken out, and the pH was measured and found to be 2.5. (The measurement of the pH was in accordance with JIS K6221.)

Further, the particle size distribution in this liquid was measured by Microtrac UPA, manufactured by Nikkiso K.K. and found to be 77 nm as an average 50% dispersed size. This liquid was sampled and confirmed by an optical microscope with 400 magnifications, whereby it was found that the liquid was in a good dispersed state, and the entirety was in a micro-Brownian motion, no aggregation occurred with time, and the dispersion stability was good.

Then, this liquid was subjected to filtration with a micropore filter having a pore size of 0.1 $\mu$m to remove carbon black and to obtain a filtrate. The concentration of extracted humic acid in this carbon black after filtration was measured and found to be 0.1 as absorbance of ultraviolet of 255 nm.

On the other hand, the carbon black obtained by the filtration was dried at 60° C., and the total amount of acid groups was measured and found to be 450 $\mu$equ/g. Further, the nitrogen adsorption specific surface area was 120 $m^2$. Accordingly, the total amount of acid groups per unit area was 3.75 $\mu$equ/$m^2$.

Further, the active hydrogen content of this carbon black was 1.20 mequ/g.

Further, to this dispersion, a 0.1N NaOH solution was added to adjust the pH to 10. Even when the pH was further raised to 12, the particle size distribution did not change and was 78 $\mu$m, and the dispersed state as observed by an optical microscope, was good.

These two types of dispersions were packed in cartridges made by Kabushiki Kaisha NEC by centrifugal separation of 5000 rpm, and printing was carried out by means of a printer "PR101", manufactured by NEC K.K., whereby a good printed product free from running or thinning, was obtained.

Example 2

Treatment was carried out in the same manner as in Example 1 except that the reaction time of ozone was changed to 4 hours.

The pH of the obtained dispersion was 2.2, and the average 50% dispersed diameter was 70 nm. The total amount of acid groups per unit specific surface area was 6.9 $\mu$equ/$m^2$, and the concentration of extracted humic acid in the carbon black after filtration was 0.1 as absorbance of ultraviolet of 255 nm.

The optical microscopic dispersion of this dispersion was good, and printing was carried out in the same manner as in Example 1 by packing the ink in a cartridge made by Kabushiki Kaisha NEC, whereby a good printing product free from running or thinning, was obtained.

Example 3

Treatment was carried out in the same manner as in Example 2 except that the carbon black was changed to "#960" (manufactured by Mitsubishi Chemical Corporation, sulfur content: 0.3%, total content of alkali metals and alkaline earth metals: 0.12%).

The pH of the obtained dispersion was 2.1. The total amount of acid groups in the carbon black after filtration was 900 $\mu$equ/g, the specific surface area was 240 $m^2$, and the total amount of acid groups per unit specific surface area was 3.75 $\mu$equ/$m^2$. The average 50% dispersed diameter was 45 nm. Further, the concentration of extracted humic acid was 0.3 as absorbance of ultraviolet of 255 nm.

Comparative Example 1

20 g of carbon black "#47" was taken, dried at 105° C. for 1 hour, cooled and then put into a glass column having a length of 20 cm and a diameter of 5 cm, and 8 wt % ozone was supplied from the bottom to carry out the reaction for 2 hours.

The total amount of acid groups in the obtained oxidation-treated carbon black was 800 $\mu$equ/g, the specific surface area was 122 $m^2$, and the total amount of acid groups per unit specific surface area was 6.57 $\mu$equ/$m^2$.

The active hydrogen content of this carbon black was 3.5 mequ/g.

The amount of extracted humic acid was measured by the same operation as in Example 1 and was found to be 0.40 as absorbance of ultraviolet of 255 nm.

4 g of this carbon black was put into 100 cc of water, followed by stirring for 5 minutes by a homomixer.

The state of carbon black in this mixture was observed by an optical microscope, whereby aggregates having a particle size of about 400 nm were observed abundantly and not in a dispersed state.

Further, the pH of the liquid was 2.8.

Further, this liquid was subjected to centrifugal separation at 5000 rpm, whereby most carbon black sedimented and could not be used for printing.

As is apparent also from the foregoing Examples and Comparative Examples, by carrying out oxidation treatment by ozone in the coexistence of water and carbon black by the present invention, it is possible to obtain a dispersion which has good dispersion stability even without special dispersing treatment, which contains little impurities which cause clogging, such as humic acid, and which is useful for a water-base ink.

Example 4

20 g of carbon black "#47" was put into 500 cc of water containing 0.001N of acetic acid and dispersed for 5 minutes by a household mixer.

The obtained dispersion was put into a 3 lit. glass container equipped with a stirrer. While stirring by the stirrer, an ozone-containing gas having an ozone concentration of 10 wt %, was introduced for 1.5 hours at 500 cc/min.

At that time, a discharge type ozonizer using pure oxygen, made by US PCI Co., was used as the ozone generator.

This liquid was taken out, and the pH was measured and found to be 2.6. (The measurement of the pH was in accordance with JIS K6221.)

Further, the particle size distribution in this liquid was measured by Microtrac UPA, manufactured by Nikkiso K.K., whereby it was 80 nm as an average 50% diameter. This liquid was taken and confirmed by an optical microscope with 400 magnifications, whereby it was in a good dispersed state, the entirety was in a micro-Brownian motion, no aggregation occurred with time, and the dispersion stability was good.

Then, this liquid was subjected to filtration by means of a micropore filter having a pore diameter of 0.1 μm to remove carbon black and to obtain a filtrate, and the concentration of humic acid in this filtrate was measured.

The concentration of this extracted humic acid was 0.05 as absorbance of ultraviolet of 255 nm.

On the other hand, the carbon black after filtration was dried at 60° C., and the total amount of acid groups was measured and found to be 480 μequ/g. Since the specific surface area was 120 m$^2$, the total amount of acid groups per unit specific surface area was 4.0 μequ/m$^2$.

This dispersion was subjected to centrifugal separation at 5000 rpm to remove foreign matters, and packed into a cartridge made by NEC K.K, and printing was carried out by means of a printer "PR101", made by NEC K.K., whereby a good printed product free from running or thinning, was obtained.

Example 5

20 g of carbon black "#47" was put into 500 cc of water containing 0.1N of acetic acid and dispersed for 5 minutes by a household mixer.

The obtained dispersion was put into a 3 lit. glass container equipped with a stirrer.

While stirring by the stirrer, an ozone-containing gas having an ozone concentration of 10 wt %, was introduced for 1.5 hours at 500 cc/min.

At that time, a discharge type ozonizer employing pure oxygen, made by US PCI Co., was used as the ozone generator.

The obtained dispersion was taken out, and the pH was measured and found to be 2.4.

Further, the particle size distribution in this liquid was measured by Microtrac UPA, made by Nikkiso K.K., whereby it was 75 nm as an average 50% diameter. This liquid was taken and confirmed by an optical microscope with 400 magnifications, whereby it was found that it was in a good dispersed state, the entirety was in a micro-Brownian motion, no aggregation occurred with time, and the dispersion stability was good.

Then, this liquid was subjected to filtration by means of a micropore filter having a pore diameter of 0.1 μm to remove carbon black and to obtain a filtrate, and the concentration of humic acid in this filtrate was measured.

The concentration of this extracted humic acid was 0.20 as absorbance of ultraviolet of 255 nm.

On the other hand, the carbon black after filtration was dried at 60° C., and the total amount of acid groups was measured and found to be 720 μequ/g. Since the specific surface area was 120 m$^2$, the total amount of acid groups per unit specific surface area was 6.0 μequ/m$^2$.

This aqueous dispersion was subjected to centrifugal separation for 30 minutes at 5000 rpm to remove foreign matters, and then the dispersion was packed into a cartridge made by NEC K.K, and printing was carried out by means of a printer "PR101", made by NEC K.K., whereby a good printing free from running or thinning, was obtained.

Example 6

Treatment was carried out in the same manner as in Example 4 except that the carbon black was changed to "#960".

The pH of the obtained dispersion was 2.1, the concentration of extracted humic acid was 0.9 as absorbance of ultraviolet of 255 nm, and the total amount of acid groups in the carbon black after filtration was 560 μequ/g.

Comparative Example 2

20 g of carbon black "#47" was put into 500 cc of water and dispersed for 5 minutes by a household mixer.

The obtained liquid was put into a 3 lit. glass container equipped with a stirrer. While stirring by the stirrer, an ozone-containing gas having an ozone concentration of 10 wt %, was introduced for 1 hour at 500 cc/min.

At that time, a discharge type ozonizer employing pure oxygen, made by US PCI Co., was used as the ozone generator.

The liquid after the ozone treatment was taken out, and the pH was measured and found to be 2.9.

Further, the particle size distribution in this liquid was measured by Microtrac UPA, manufactured by Nikkiso K.K., whereby it was 400 nm as an average 50% dispersed diameter. This liquid was taken and confirmed by an optical microscope with 400 magnifications, whereby many aggregates were observed.

This carbon black aqueous dispersion was subjected to filtration by a 0.1 μm membrane filter. The carbon black after filtration was dried at 60° C., and the total amount of acid groups was measured and found to be 280 µequ/g. Further, the nitrogen adsorption specific surface area was 120 m². Accordingly, the total content of acid groups per unit area was 2.33 µequ/m².

This dispersion was subjected to centrifugal separation at 5000 rpm to separate foreign matters, whereby at least 50% of carbon black sedimented.

This dispersion was packed into a cartridge made by NEC K.K, and printing was carried out by means of a printer "PR101" made by NEC K.K., whereby only a thin printed product was obtained wherein the carbon black density was at most 50% as compared with Example 4 or 5.

Comparative Example 3

Treatment was carried out in the same manner as in Example 6 except that no acetic acid was incorporated.

The pH of the obtained dispersion was 2.8, and the concentration of extracted humic acid was 0.5 as absorbance of ultraviolet of 255 nm. This liquid was taken and confirmed by an optical microscope with 400 magnifications, whereby many aggregates were observed.

This carbon black aqueous dispersion was subjected to filtration by means of a 0.1 µm membrane filter, the carbon black after filtration was dried at 60° C., and the total amount of acid groups was measured and found to be 360 µequ/g. Further, the nitrogen adsorption specific surface area was 240 m². Accordingly, the total amount of acid groups per unit area was 1.5 µequ/m².

This dispersion was subjected to centrifugal separation at 5000 rpm to separate foreign matters, whereby at least 50% of carbon black sedimented.

This dispersion was packed into a cartridge made by NEC K.K., and printing was carried out by means of a printer "PR101" made by NEC K.K., whereby only a thin printed product was obtained wherein the carbon black density was at most 50% as compared with Example 1 or 2.

As is evident also from the foregoing Examples and Comparative Examples, by carrying out oxidation treatment by ozone in the coexistence of carbon black and water containing an organic acid by the present invention, it is possible to obtain a dispersion which has a dispersion stability even without a special dispersion treatment, which contains little impurities which cause clogging, such as humic acid, and which is useful for a water-base ink.

Example 7

20 g of carbon black "#47" was put into 500 cc of water containing 0.1N of acetic acid and dispersed for 5 minutes by a household mixer.

This dispersion was put into a 3 lit. glass container equipped with a stirrer.

While stirring by the stirrer, an ozone-containing gas having an ozone concentration of 2 wt %, was introduced for 15 hours at 500 cc/min. At that time, a discharge type ozonizer employing pure oxygen, made by US PCI Co., was used as the ozone generator.

This dispersion was taken out, and the pH was measured and found to be 2.0.

Further, the particle size distribution in this dispersion was measured by "Microtrac UPA" made by Nikkiso K.K., whereby it was 72 nm as an average 50% diameter. This liquid was taken and confirmed by means of an optical microscope with 400 magnifications, whereby it was found that it was in a good dispersed state, the entirety was in a micro-Brownian motion, no aggregation occurred with time, and the dispersion stability was good.

Then, this dispersion was subjected to filtration by means of a micropore filter having a pore diameter of 0.1 µm to remove carbon black and to obtain a filtrate. The concentration of humic acid in this filtrate was measured. The concentration of this humic acid was 3.1 as absorbance of ultraviolet of 255 nm.

To 100 cc of this dispersion, 50 cc of an anion exchange resin made by Mitsubishi Chemical Corporation was introduced, followed by shaking for 1 hour by a shaker to carry out adsorption.

Then, the liquid was subjected to centrifugal separation at 5000 rpm to remove foreign matters such as the ion exchange resin, and the absorbance was obtained. The absorbance was 0.8 with ultraviolet of 255 nm.

This dispersion was subjected to centrifugal separation at 5000 rpm and packed into a cartridge made by Kabushiki Kaisha NEC, and printing was carried out by means of a printer "PR101" made by NEC K.K., whereby discharge from the nozzle was good, and a good printed product free from running or thinning, was obtained.

On the other hand, the carbon black after filtration was dried at 60° C., and the total amount of acid groups was measured and found to be 500 µequ/g. Accordingly, the total amount of acid groups per unit area was 4.2 µeuq/m².

Example 8

20 g of carbon black having DBP of 147 ml/100 g and an average particle size of 16 nm, was put into 500 cc of water and dispersed for 5 minutes by a household mixer.

The obtained liquid was put into a 3 lit. glass container equipped with a stirrer. While stirring by the stirrer, an ozone-containing gas having an ozone concentration of 8 wt % was introduced for 2 hours at 500 cc/min. At that time, ozone was generated by means of an ozonizer of an electrolytic generation type made by PERMELEC ELECTRODE LTD., as the ozone generator.

The liquid after the ozone treatment was taken out, and the pH was measured and found to be 2.5. (The measurement of the pH was in accordance with JIS K6221.)

Further, the particle size distribution in this liquid was measured by "Microtrac UPA" manufactured by Nikkiso K.K., and it was 45 nm as an average 50% dispersed diameter. This liquid was taken and confirmed by means of an optical microscope with 400 magnifications, whereby it was found that it was in a good dispersed state, the entirety was in a micro-Brownian motion, no aggregation occurred with time, and the dispersion stability was good.

This dispersion was subjected to centrifugal separation at 5000 rpm and packed into a cartridge made by Kabushiki Kaisha NEC, and printing was carried out by means of a printer "PR101" made by NEC K.K., whereby a good printing product free from running or thinning, was obtained, without sedimentation or clogging of a nozzle.

Example 9

20 g of carbon black A (the physical properties are disclosed in Table 2 given below) was put into 500 cc of water and dispersed for 5 minutes by a mixer.

The obtained liquid was put into a 3 lit. glass container equipped with a stirrer. While stirring by the stirrer, an ozone-containing gas having an ozone concentration of 8 wt % was introduced for 2 hours at 500 cc/min.

At that time, ozone was generated by means of an ozonizer of an electrolytic generation type made by PERMELEC ELECTRODE LTD., as the ozone generator.

The liquid after the ozone treatment was taken out, and the pH was measured and found to be 2.6. (The measurement of the pH was in accordance with JIS K6221.)

Further, the particle size distribution in this liquid was measured by "Microtrac UPA" made by Nikkiso K.K., and it was 53 nm as a cumulative mean diameter (a volume cumulative 50% diameter). This liquid was taken and confirmed by means of an optical microscope with 400 magnifications, whereby it was found that it was in a good dispersed state, the entirety was in a micro-Brownian motion, no aggregation occurred with time, and the dispersion stability was good.

Then, this liquid was subjected to filtration by means of a membrane filter having a pore size of 0.1 $\mu$m to remove carbon black and to obtain a filtrate. The concentration of extracted humic acid in the carbon black after filtration, was measured and found to be 0.1 as absorbance of ultraviolet of 255 nm.

On the other hand, the carbon black after filtration was dried at 60° C., and the total amount of acid groups was measured and found to be 894 $\mu$equ/g. Further, the nitrogen adsorption specific surface area was 245 $m^2/g$. Accordingly, the total amount of acid groups per unit specific surface area was 3.65 $\mu$equ/$m^2$. Further, the DBP oil absorption was 143 cc/100 g.

Then, the above carbon black after filtration was re-dispersed in deionized water, and this was adjusted to pH 9.0 with an aqueous KOH solution to obtain a dispersion having a pigment concentration of 10 wt %.

To 50 parts (by weight) of this dispersion, 5 parts of glycerol and 5 parts of N-methylpyrrolidone were added, and water was further added to bring the total amount to 100 g. This was subjected to pressure filtration with a filter paper of No. 5C to remove coarse particles, and the obtained dispersed ink was packed as a recording liquid into a cartridge made by HEWLETT PACKARD, and printing was carried out by means of a printer DeskWriterC, made by HEWLETT PACKARD on two types of ordinary papers (electrophotographic papers A and B, electrophotographic paper A: pH 6.4 as measured by JIS P8133, electrophotographic paper B: pH 9.1 as measured by JIS P8133) and special paper for ink jet (Canon HR-101), whereby the discharge stability, printing quality and kogation tests and the storage stability test of the recording liquid, were carried out, and evaluation was made under the following standards. Evaluation of the printing density of the obtained printed product was made by means of a Macbeth reflection densitometer (RD914). The evaluation results are shown in Table 1 given below.

The evaluation results of the discharge stability and the printing quality were classified as follows and shown in Table 1 given below.

Discharge Stability

◯: Constant discharge was observed without printing failure.

Δ: No practical problem was observed although printing failure was slightly observed.

×: Printing failure was substantial.

Printing Quality

◯: No running was observed.

Δ: No practical problem was observed although slight running was observed.

×: Running was substantial.

Kogation Test

Using the obtained recording liquid, a solid print of 15 cm×25 cm was carried out on 25 sheets of electrophotographic paper (Xerox 4024 paper, product of Xerox) by means of a heating type ink jet printer (DeskWriterC, manufactured by HEWLETT PACKARD). Then, the head was gently disassembled, and the electrode plate was gently washed with deionized water. After drying, deposition on the electrode plate was observed by an optical microscope. The results were classified as follows, and shown in Table 1 given below.

◯: Deposition was slightly observed, but no practical problem.

Δ: Deposition was observed a little.

×: Substantial deposition was observed.

Storage Stability Test

The recording liquid was sealed in a Teflon container and stored at 60° C. for 1 month. Gelation and presence or absence of sediment were visually evaluated. The results were classified as follows and shown in Table 1 given below.

◯: Substantially no gelation or sediment was observed.

Δ: Gelation or sediment was slightly observed, but no practical problem.

×: Substantial gelation or sediment was observed.

Example 10

Treatment was carried out in the same manner as in Example 9 except that the reaction time of ozone was changed to 4 hours.

The pH of the obtained dispersion was 2.4, the cumulative mean diameter was 50 nm, the total amount of acid groups was 1715 $\mu$equ/g, the nitrogen adsorption specific surface area was 256 $m^2/g$, the total amount of acid groups per unit specific surface area was 6.7 $\mu$equ/$m^2$, and the concentration of extracted humic acid in the carbon black was 0.1 as absorbance of ultraviolet of 255 nm. Further, the DBP oil absorption was 141 cc/100 g.

Using this carbon black, a recording liquid was prepared in the same manner as in Example 1, and the ink was packed into a cartridge made by HEWLETT PACKARD in the same manner as in Example 1, and printing was carried out, whereby a good printed product free from running or thinning was obtained. The evaluation results are shown in the following Table 1.

Example 11

Treatment was carried out in the same manner as in Example 10 except that the carbon black was changed to carbon black B (the physical properties are disclosed in Table 2 given below).

The pH of the obtained dispersion was 2.2. The total amount of acid groups in the carbon black after filtration was 1125 $\mu$equ/g. The specific surface area was 300 $m^2/g$, and accordingly, the total amount of acid groups per unit specific surface area was 3.75 $\mu$equ/$m^2$. The accumulative mean diameter was 40 nm. Further, the concentration of extracted humic acid was 0.2 as absorbance of ultraviolet of 255 nm. Further, the DBP oil absorption was 151 cc/100 g.

Using this carbon black, a recording liquid was prepared in the same manner as in Example 9, and the ink was packed into a cartridge made by HEWLETT PACKARD in the same manner as in Example 9, and printing was carried out, whereby a good printed product free from running or thinning, was obtained. The evaluation results are shown in Table 1 given below.

Example 12

20 g of carbon black A (the physical properties are disclosed in Table 2 given below) was put into 250 cc of water and dispersed for 5 minutes by a household mixer. The obtained dispersion was put into a glass reactor having a length of 500 mm and a diameter of 60 mm and provided with a perforated plate at the bottom, and through the perforated plate, a 10 wt % ozone gas was introduced for 5 hours at 3 lit./min by G-2 model ozone generator (electric discharge type) made by PCI Co., whereby oxidation treatment was carried out. This liquid was taken out, and the pH was measured and found to be 2.2. Further, the particle size distribution in this liquid was measured by Microtrac UPA, made by Nikkiso K.K., and it was found to be 50 nm as a cumulative mean diameter. Then, this liquid was subjected to filtration by means of a micropore filter having a pore diameter of 0.1 $\mu$m to obtain a water-containing carbon black. The concentration of extracted humic acid in this carbon black was measured, and was found to be 0.2 as absorption of ultraviolet of 255 nm. This carbon black was dried at 60° C. to remove water, and the total amount of acid groups was measured. The total amount of acid groups of this carbon black was 800 $\mu$equ/g. Further, the nitrogen adsorption specific surface area was 260 m$^2$/g. Accordingly, the total amount of acid groups per unit specific surface area was 3.08 $\mu$equ/m$^2$. Further, the DBP oil absorption was 140 cc/100 g.

Further, the water-containing carbon black after filtration with the microfilter was put into water so that the concentration became 7.5% and dispersed for 10 minutes by an ultrasonic cleaning machine to obtain a dispersion in a total amount of 50 cc.

This dispersion was subjected to centrifugal separation at 5000 rpm to remove foreign matters and then packed into a cartridge made by Kabushiki Kaisha NEC, and printing was carried out by means of a printer "PR101/J180" made by NEC K.K., whereby a good printed product free from running of thinning, was obtained.

The printing density of this printed product was measured by a Macbeth reflection densitometer and found to be 1.69.

Example 13

Treatment was carried out under the same conditions as in Example 4 using Mitsubishi Carbon Black "#990" (DBP oil absorption: 112 cc/100 g, average particle size: 16 nm) instead of carbon black of Example 12. The cumulative mean diameter of the obtained carbon black as measured by Microtrac UPA, was 50 nm, and the total amount of acid groups was 750 $\mu$equ/g. The extracted humic acid concentration was 0.2 as absorption of ultraviolet of 255 nm. Further, the nitrogen adsorption specific surface area was 265 m$^2$/g, and the total amount of acid groups per unit specific surface area was 2.83 $\mu$equ/m$^2$. Further, the DBP oil absorption was 97 cc/100 g.

Further, this dispersion was subjected to filtration by means of a micropore filter having a pore diameter of 0.1 $\mu$m, and the water-containing carbon black was put into water so that the concentration became 7.5% and dispersed for 10 minutes by an ultrasonic cleaning machine to obtain a dispersion in a total amount of 50 cc.

This dispersion was subjected to centrifugal separation at 5000 rpm to remove foreign matters and then packed into a cartridge made by Kabushiki Kaisha NEC in the same manner as in Example 4, and printing was carried out by means of a printer "PR101/J180" made by NEC K.K., whereby a good printed product free from running or thinning, was obtained.

The printing density of this printed product was measured by a Macbeth reflection densitometer and found to be 1.48.

TABLE 1

| | Printing density | | | | | | |
| --- | --- | --- | --- | --- | --- | --- | --- |
| | Ordinary papers | | Special | | | | |
| | Electro-photographic paper A | Electro-photographic paper B | paper for ink jet HR-101 | Kogation test | Discharge stability | Printing quality | Storage stability test |
| Example 9 | 1.41 | 1.43 | 1.55 | ◯ | ◯ | ◯ | ◯ |
| Example 10 | 1.43 | 1.45 | 1.57 | ◯ | ◯ | ◯ | ◯ |
| Example 11 | 1.44 | 1.54 | 1.56 | ◯ | ◯ | ◯ | ◯ |
| Comparative Example 1 | 1.25 | 1.27 | 0.38 | ◯ | ◯ | ◯ | ◯ |

TABLE 2

|  | Carbon black A | Carbon black B | #960 | #990 | MA7 | #47 | #45L |
|---|---|---|---|---|---|---|---|
| Primary particle size (nm) | 16 | 15 | 16 | 16 | 24 | 23 | 24 |
| Specific surface area ($m^2/g$) | 262 | 316 | 250 | 250 | 115 | 132 | 115 |
| DBP oil absorption (cc/100 g) | 147 | 143 | 71 | 112 | 66 | 64 | 45 |
| pH | 4.2 | 8.0 | 8.0 | 7.0 | 3.0 | 7.5 | 8.0 |
| FC[*1)]/CC[*2)] | FC | FC | FC | FC | FC | FC | FC |
| Sulfur content (wt %) | 0.5 | 0.4 | 0.3 | 0.3 | 0.5 | 0.5 | 0.4 |
| Total content of alkali metals and alkaline earth metals (wt %) | 0.1 | 0.1 | 0.12 | 0.03 | 0.05 | 0.06 | 0.2 |

[*1)]FC: Furnace carbon black
[*2)]CC: Channel carbon black

INDUSTRIAL APPLICABILITY

By the present invention, a carbon black is obtainable which has excellent properties as a black pigment, such that good dispersion stability is maintained in various media, it is free from sedimentation or clogging at a pen point or in an orifice of a nozzle, constant dischargeability is obtainable as a water-base ink for ink jet or for writing, streaks or hard spots can be suppressed when made into a coating material.

It is claimed:

1. A method for producing oxidation-treated carbon black, which comprises oxidizing carbon black in ozone in the presence of water which contains at least 0.001N of an organic acid until the total amount of acid groups of the carbon black becomes at least 3 $\mu$equ/$m^2$.

2. The method for producing oxidation-treated carbon black according to claim 1, which comprises oxidizing carbon black in which the total content of alkali metals and alkaline earth metals is at most 1 wt %.

3. The method for producing oxidation-treated carbon black according to claim 1, which comprises oxidizing carbon black in which the total content of sulfur and sulfur compounds is at most 0.5 wt % as analyzed as sulfur.

4. A water-based ink for ink jet comprising an aqueous dispersion of an oxidation-treated carbon black prepared by oxidation-treating carbon black with an oxidizing agent, wherein the total amount of acid groups is at least 3 $\mu$equ/$m^2$, and the extracted humic acid concentration is at most 1 as absorbance.

5. The water-based ink according to claim 4, wherein the oxidizing agent is ozone.

6. The water-based ink according to claim 4, wherein the oxidation treatment is carried out in the presence of water.

7. The water-based ink according to claim 4, which has a pH of from 2 to 10.

8. A method for producing a carbon black dispersion, which comprises removing humic acid from a dispersion having oxidation-treated carbon black dispersed in water, to bring the humic acid concentration in the dispersion to a level of at most 1 as absorbance, wherein the removal of humic acid is carried out by active carbon or by an anion exchange resin.

9. The method for producing a carbon black dispersion according to claim 8, wherein the removal of humic acid is carried out by active carbon.

10. The method for producing a carbon black dispersion according to claim 8, wherein the removal of humic acid is carried out by an anion exchange resin.

11. The method for producing a carbon black dispersion according to claim 8, wherein the oxidation-treated carbon black is one prepared by oxidation treating carbon black by ozone in the presence of water.

* * * * *

UNITED STATES PATENT AND TRADEMARK OFFICE
CERTIFICATE OF CORRECTION

PATENT NO.   : 6,123,759

DATED        : September 26, 2000

INVENTOR(S): Nobutake MISE, et al.

It is certified that an error appears in the above-identified patent and that said Letters Patent is hereby corrected as shown below:

On the Title Page, Item [30], the Foreign Application Priority Data is incorrect. Item [30] should read as follows:

--[30]  Foreign Application Priority Data
    Dec. 26, 1996   [JP]   Japan  .......................... 8-347529
    Jan. 7, 1997    [JP]   Japan  .......................... 9-000699
    Jan. 29, 1997   [JP]   Japan  .......................... 9-015222
    Sep. 22, 1997   [JP]   Japan ........................... 9-256388    --

Signed and Sealed this

Fifteenth Day of May, 2001

Attest:

NICHOLAS P. GODICI

Attesting Officer        Acting Director of the United States Patent and Trademark Office